No. 885,470.  
PATENTED APR. 21, 1908.
G. HALLEY.  
HEATING DRUM.  
APPLICATION FILED APR. 17, 1907.
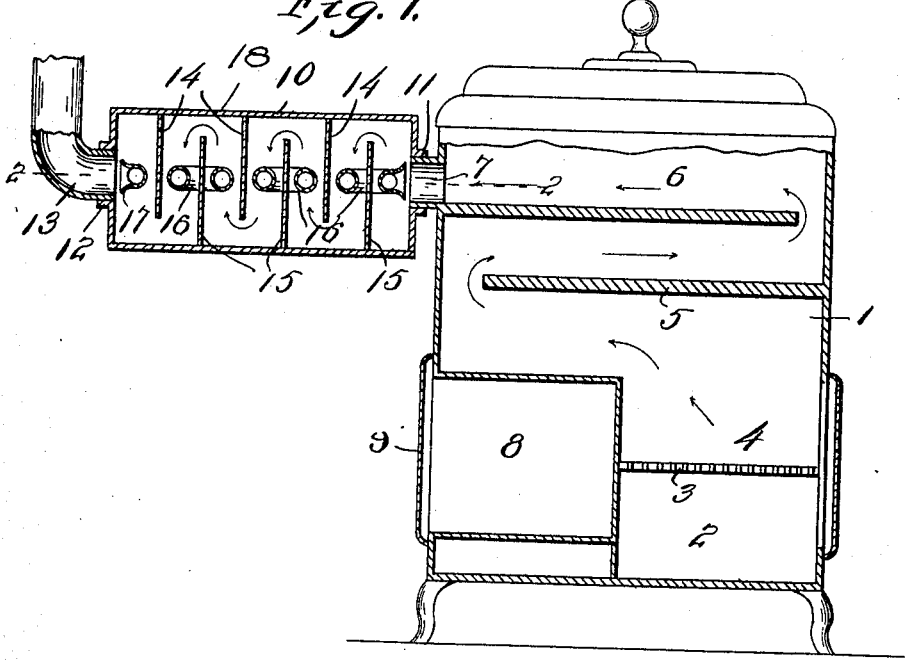
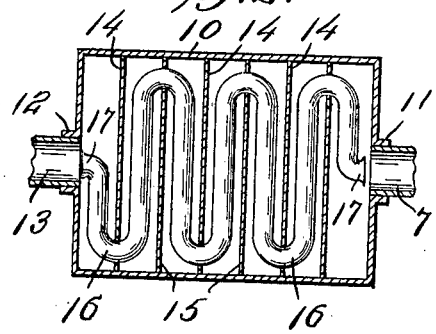
Witnesses  
Inventor  
Geo. Halley,  
By  
Attorneys

UNITED STATES PATENT OFFICE.

GEORGE HALLEY, OF NEVADA, IOWA.

HEATING-DRUM.

No. 885,470.  Specification of Letters Patent.  Patented April 21, 1908.

Application filed April 17, 1907. Serial No. 368,685.

*To all whom it may concern:*

Be it known that I, GEORGE HALLEY, a citizen of the United States, residing at Nevada, in the county of Story, State of Iowa, have invented certain new and useful Improvements in Heating-Drums; and I do hereby declare the following to be a full, clear, and exact description of the invention, such as will enable others skilled in the art to which it appertains to make and use the same.

This invention relates to new and useful improvements in heating drums for stoves and more particularly to heating drums serving as a cooking attachment.

In connection with a device of the above type the invention has for its object to provide a novel construction and arrangement of parts, whereby the heat is uniformly distributed to the surface of the heating attachment with the greatest degree of radiation possible.

The details of construction will appear in the course of the following description, in which reference is had to the accompanying drawings forming a part of this specification, like characters of reference designating similar parts throughout the several views, wherein:

Figure 1 is a central longitudinal section of a heating stove constructed in accordance with the present invention. Fig. 2 is a central horizontal section on the line 2—2 of Fig. 1, the tortuous pipe through which the heated air passes being shown in elevation.

Referring specifically to the accompanying drawings, the numeral 1 designates a heating stove or furnace of conventional form including the ashpit 2, the grate 3, firebox 4, draft-wall 5, and the discharge passage 6, the latter communicating with a pipe section 7 leading from the furnace. Within the stove 1 is supported an oven 8 which is closed by a door 9.

The cooking attachment which forms the subject matter of the present invention comprises a casing 10 preferably rectangular and formed at its ends with thimbles 11 and 12, the thimble 11 being engaged with the pipe section 7 and the thimble 12 being engaged with a pipe section 13 leading to the chimney.

The casing 10 is constituted with baffle plates 14 depending from its top wall and terminating short of its bottom wall and with baffle plates 15 projecting from its bottom wall and terminating short of its top wall. The plates 15 are arranged alternately between the plates 14 and partially overlap the same so that a tortuous passage for the travel of the heated products through the casing is afforded as indicated by the arrows.

The plates 14 and 15 conjointly support a pipe 16 having enlarged or flaring ends 17 which register with pipe sections 7 and 13. The pipe 16 between its ends is formed with sinuous convolutions, and at the bends between the adjacent pairs of convolutions passes through the plates 14 and 15 in their alternate occurrence. It will thus be seen that the convolutions extend in opposite directions alternately in the spaces between the adjacent pairs of said plates.

In use, in addition to the baking which may be done in the oven 8, the casing 10 is utilized for any of the purposes of a cooking stove. It will be obvious that due to the relation of the baffle plates, the products of combustion are directed constantly during the tortuous travel thereof to the top plate 18 of said casing 10 and also by the trend of the sinuous convolutions of the pipe 16 effects an increase radiation of heat throughout the area of the interior portion of said casing 10 and in this manner increases the heating qualities of the attachment, and at the same time giving the requisite draft in said pipe.

The attachment embodied in the present invention is applicable to any conventional form of stove and is simple in construction, inexpensive to manufacture, and practical in use.

From the foregoing description it will be seen that simple and efficient means are provided for accomplishing the objects of the invention, but, while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

An attachment for heating stoves, comprising a casing adapted for communication with a stove and its chimney, baffle plates projecting in parallel relation alternately from the top and bottom of said casing to form a continuous tortuous passage therein, and a sinuous convoluted conductor within said casing and supported by said baffle plates, said conductor terminating at opposite ends adjacent the communications with the stove and its chimney.

In testimony whereof, I affix my signature, in presence of two witnesses.

GEORGE HALLEY.

Witnesses:
    JAY O. DUTTON,
    J. A. MILLS.